US008688377B1

(12) United States Patent
Urbach et al.

(10) Patent No.: US 8,688,377 B1
(45) Date of Patent: Apr. 1, 2014

(54) SYSTEM AND METHOD OF USING AUTOMATICALLY-IDENTIFIED PROMINENT ESTABLISHMENTS IN DRIVING DIRECTIONS

(75) Inventors: Shlomo Urbach, Rehovot (IL); Lior Ron, San Francisco, CA (US); Felix Geller, Langnau Am Albis (CH)

(73) Assignee: Google Inc., Mountain View, CA (US)

( * ) Notice: Subject to any disclaimer, the term of this patent is extended or adjusted under 35 U.S.C. 154(b) by 104 days.

(21) Appl. No.: 13/399,192

(22) Filed: Feb. 17, 2012

(51) Int. Cl.
*G01C 21/30* (2006.01)
*G01C 21/00* (2006.01)

(52) U.S. Cl.
CPC .............. *G01C 21/30* (2013.01); *G01C 21/00* (2013.01)
USPC ........... 701/522; 701/400; 701/425; 701/523; 701/532

(58) Field of Classification Search
USPC ........... 701/25, 400, 408, 425, 426, 436, 438, 701/522, 523; 340/988–995.28; 455/456.1, 455/456.2
See application file for complete search history.

(56) References Cited

U.S. PATENT DOCUMENTS

| | | | |
|---|---|---|---|
| 6,199,014 B1 * | 3/2001 | Walker et al. | 701/428 |
| 6,477,460 B2 * | 11/2002 | Kepler | 701/426 |
| 6,748,225 B1 * | 6/2004 | Kepler | 455/456.2 |
| 6,766,245 B2 * | 7/2004 | Padmanabhan | 701/409 |
| 7,606,416 B2 * | 10/2009 | Han et al. | 382/171 |
| 7,912,637 B2 * | 3/2011 | Horvitz et al. | 701/33.4 |
| 7,941,269 B2 * | 5/2011 | Laumeyer et al. | 701/523 |
| 8,060,302 B2 * | 11/2011 | Epshtein et al. | 701/438 |
| 8,086,048 B2 * | 12/2011 | Naaman et al. | 382/225 |
| 8,204,683 B2 * | 6/2012 | McQuaide, Jr. | 701/431 |
| 8,274,406 B2 * | 9/2012 | Karlsson et al. | 340/995.1 |
| 8,364,398 B2 * | 1/2013 | Rossio et al. | 701/439 |
| 8,442,767 B2 * | 5/2013 | Rossio et al. | 701/532 |
| 2008/0273795 A1 * | 11/2008 | Ofek et al. | 382/170 |
| 2011/0178697 A1 | 7/2011 | Mincey et al. | |

OTHER PUBLICATIONS

"Turn right after the petrol pump" [online]. Dec. 16, 2009. [Retrieved Feb. 17, 2012]. Retrieved from the Internet: <http://googleindia.blogspot.com/2009/12/turn-right-after-petrol-pump-landmarks.html, 2 pages.

* cited by examiner

*Primary Examiner* — Thomas Tarcza
*Assistant Examiner* — Tyler J Lee
(74) *Attorney, Agent, or Firm* — Lerner, David, Littenberg, Krumholz & Mentlik, LLP

(57) ABSTRACT

A system and method provides turn-by-turn directions by identifying placemarks, such as businesses or other landmarks that appear along a traveled route. The system may determine whether signage is associated with each placemark along the route and whether the signage is visible from the route. The system may also determine how prominent the signage is from the route. The system selects the placemark by determining how easily the placemark may be identified from the route, based on the signage's visibility and prominence. The selected placemark may then be identified in connection with the turn-by-turn directions.

21 Claims, 12 Drawing Sheets

SYSTEM AND METHOD OF USING AUTOMATICALLY-IDENTIFIED PROMINENT ESTABLISHMENTS IN DRIVING DIRECTIONS

BACKGROUND

Various navigation systems provide users with turn-by-turn directions. These systems include handheld GPS devices, mobile phones, vehicle-mounted devices, or other computers with access to mapping websites. In such systems, users input one or more locations and receive a route and turn-by-turn directions. The user may then follow the turn-by-turn directions to reach the one or more locations.

In navigation systems which include portable devices such as handheld or vehicle-mounted devices, the device may provide instructions visually and/or audibly in order to assist the driver follow the route and turn-by-turn directions. These instructions may provide, for example, the name of the street, or the route number, onto which the driver is to turn, or the distance to the next turn. However the user may not be familiar with the street names or route numbers provided by the navigation system, and this information may not be readily visible to the user while driving.

BRIEF SUMMARY

An aspect of the invention provides for a method of generating turn-by-turn directions on a network. The method includes receiving, by a server, a request for turn-by-turn directions, the request including a first location and a second location; identifying a route between the first location and the second location; identifying placemarks that are located along the route, wherein the placemarks include signage that is associated with the placemark; determining how identifiable the signage is from the route; selecting a placemark based on the signage's identifiability; generating a turn-by-turn direction that includes the selected placemark; and transmitting the turn-by-turn directions to a client device.

In one example, the signage's identifiability includes at least one of the following factors: the signage's visibility from the route, the signage's prominence from the route, and the placemark's notoriety.

In another example, the signage's visibility is determined by accessing an image corresponding to a location along the route, identifying one or more text strings within the image, and determining the extent to which the text string matches the name of a placemark located along the route.

In a further example, the signage's prominence from the route is determined by accessing an image corresponding to a location along the route, identifying a text string within the image that corresponds to the placemark, and determining the viewing angle covered by the width of the text.

In still a further example, the signage's prominence from the route is determined by accessing an image corresponding to a location along the route, identifying a text string within the image that corresponds to the placemark, accessing depth information to determine the distance of the text string from the image's location, and multiplying the area of the text string within the image by a depth factor in order to determine the physical size of the text string.

In yet another example, the size of the text string relative to the size of the entire image is determined by comparing the width of the text string with the width of the entire image.

In another example, the size of the text string relative to the size of the entire image is determined by comparing the area of the text string with the area of the entire image.

In a further example, the placemark's notoriety is determined by whether the placemark corresponds to an entity having a plurality of locations throughout a predefined region.

In still a further example, the placemark's notoriety is determined by whether the placemark is designated as being well known within a predefined region.

In still a further example, the generated turn-by-turn direction includes a command to take an action relative to the position of the selected placemark.

In yet another example, content is associated with the selected placemark and content is transmitted with the turn-by-turn direction to a client device. The content may be information associated with a business and may consist of an image, coupon, advertisement, or website.

Another aspect of the invention provides for a device for generating turn-by-turn directions over a network. The device includes a processor; and memory coupled to the processor, the memory including a first part for storing the instructions and a second part for storing turn-by-turn directions; and the processor being configured to: receiving a request for turn-by-turn directions, the request including a first location and a second location; identifying a route between the first location and the second location; identifying placemarks that are located along the route, wherein the placemarks include signage that is associated with the placemark; determining the signage's identifiability score along the route; selecting a placemark based on the signage's identifiability score; generating a turn-by-turn direction that includes the selected placemark; and transmitting the turn-by-turn direction to a client device.

Another aspect of the invention provides for a device for displaying turn-by-turn directions. The device includes a processor; a user input apparatus for providing data to the processor; and a display for displaying data processed by the processor in accordance with instructions; the processor being configured to: transmit, to a server on a network, a request for turn-by-turn directions, the request identifying a first location and a second location; transmit, to the server, user information stored in the memory of the device; receive, from the server, a route between the first location and the second location, a turn-by-turn direction, and a placemark selected from a plurality of placemarks, wherein the placemark include signage that is associated with the placemark, and wherein the placemark is selected based on the signage's identifiability from the route; and display the turn-by-turn direction and the placemark on the electronic display.

In one example, the device also includes a geographic location instrument and wherein the received placemark is associated with a geographic location proximate to a current location of the device and wherein the processor is further configured to: determine the current location of the device based on the geographic location instrument; and transmit the current location of the device to the server.

DETAILED DESCRIPTION

In one aspect, the system and method provides turn-by-turn directions including placemarks that are easily identifiable by a user. Each placemark represents a geographically located object such as a business or landmark. A client device of the user may transmit an initial and a final location. Upon receipt of the locations, a server may determine a route comprised of a plurality of route segments. For each route segment associated with a plurality of placemarks, the server may determine whether signage is associated with each placemark and whether the signage is visible from the route. The server may also determine how prominent the signage is from the route. The server selects the placemark by determining how easily the placemark may be identified from the route, based on the signage's visibility and prominence. The selected placemark is associated with the route segment and is used to generate a turn-by-turn direction for the route segment, where information associated with the placemark is displayed on a client device.

Figure 1:
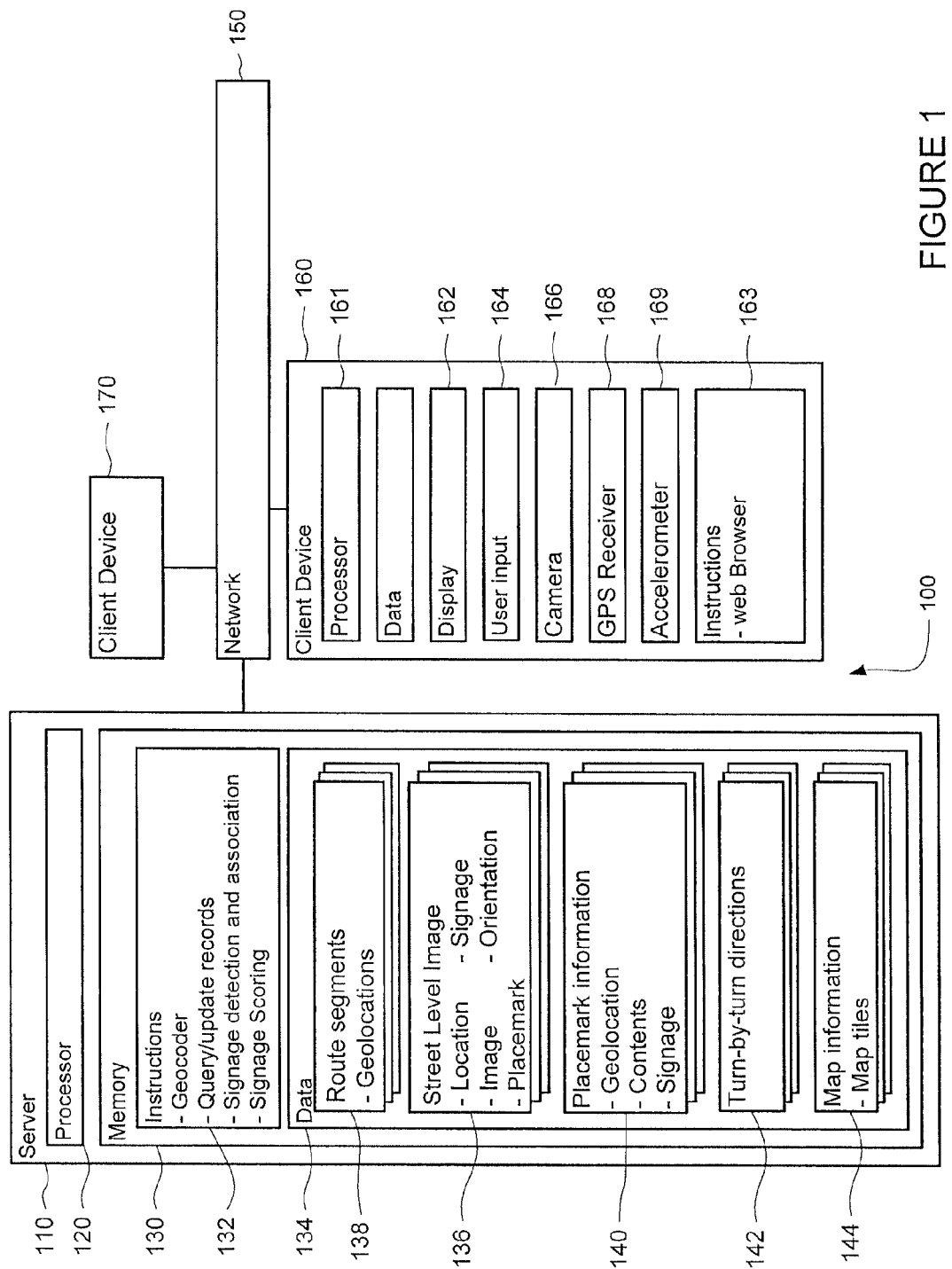
FIG. 1 is a functional diagram of a system in accordance with an aspect of the invention.
Figure 2:
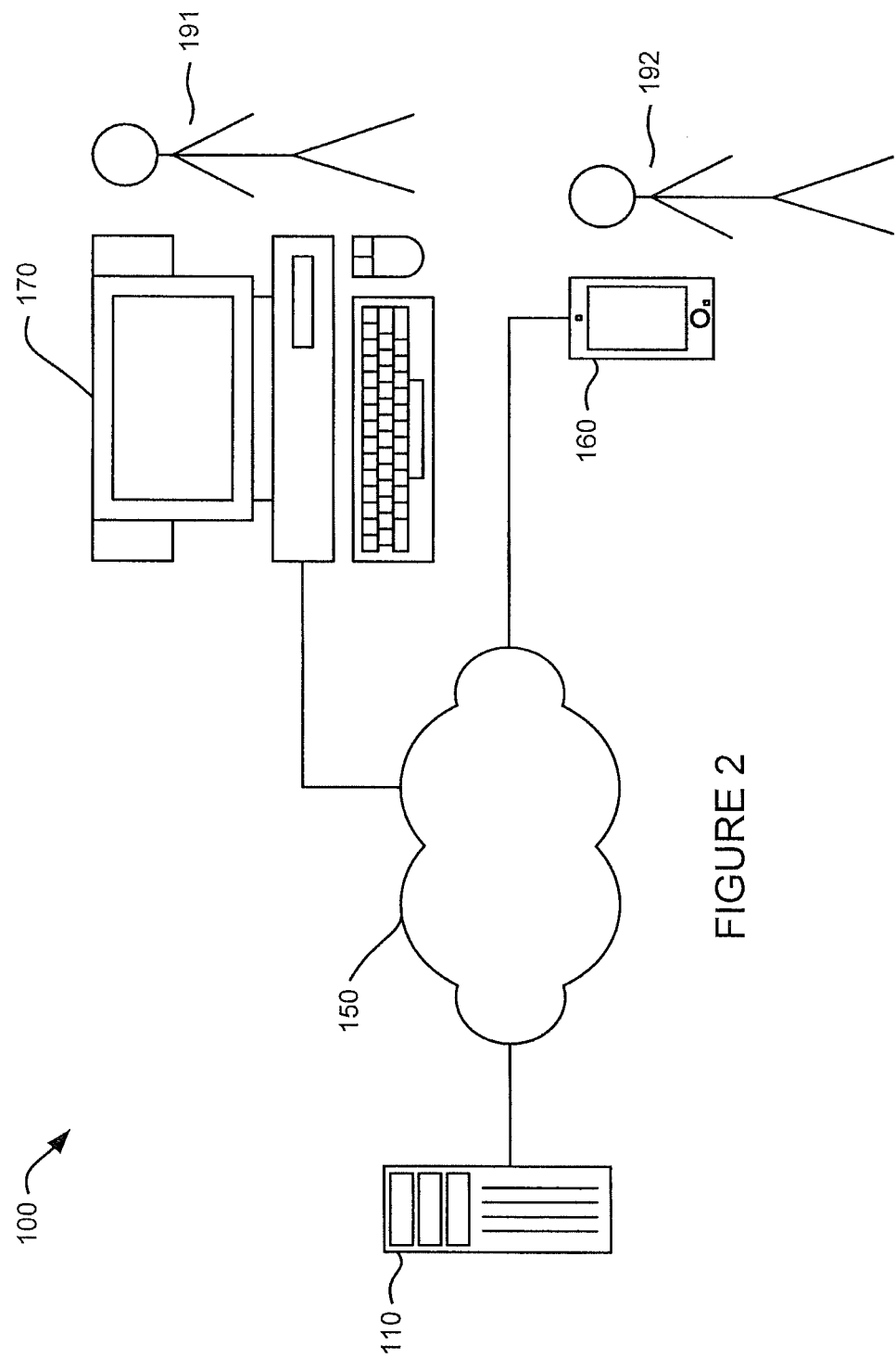
FIG. 2 is a pictorial diagram of the system of FIG. 1.

As shown in FIGS. 1-2, a system 100 in accordance with one aspect of the invention includes a computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated device such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor, computer, or memory will be understood to include references to a collection of processors, computers, or memories that may or may not operate in parallel.

The computer 110 may be at one node of a network 150 and capable of directly and indirectly communicating with other nodes of the network. For example, computer 110 may comprise a web server that is capable of communicating with client devices 160 and 170 via network 150 such that server 110 uses network 150 to transmit and display information to a user, such as person 191 or 192 of FIG. 2, on display 162 of client device 160. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Network 150, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor 161, memory and instructions 163. Each client device 160 or 170 may be a device intended for use by a person 191-192, and have all of the components normally used in connection with a computer such as a central processing unit (CPU), memory (e.g., RAM and internal hard drives) storing data and instructions such as a web browser, an electronic display 162 (e.g., a monitor having a screen, a small LCD touch-screen, a projector, a television, a computer printer or any other electrical device that is operable to display information), and user input 164 (e.g., a mouse, keyboard, touch-screen and/or microphone). The client device may also include a camera 166, GPS receiver 168, speakers, a network interface device, as well as all of the components used for connecting these elements to one another.

Although the client devices 160 and 170 may each comprise a full-sized personal computer, they may alternatively comprise mobile devices capable of wirelessly exchanging data with a server over a network such as the Internet. By way of example only, client device 170 may be a wireless-enabled PDA, a cellular phone, tablet PC, or notebook capable of obtaining information via the Internet. The user may input information using a small keyboard, a keypad, or a touch screen. Indeed, client devices in accordance with the systems and methods described herein may comprise any device capable of processing instructions and transmitting data to and from humans and other computers including general purpose devices, network computers lacking local storage capability, and set-top boxes for televisions.

The client devices may also include a geographic location instrument to determine the geographic location and orientation of the device. For example, client device 171 may include a GPS receiver 168 to determine the device's latitude, longitude and/or altitude position. The geographic position component may also comprise software for determining the position of the device based on other signals received at the client device 160, such as signals received at a cell phone's antenna from one or more cellular towers if the client device is a cell phone. It may also include an accelerometer, gyroscope or other acceleration device 169 to determine the direction in which the device is oriented. By way of example only, the acceleration device may determine its pitch, yaw or roll (or changes thereto) relative to the direction of gravity or a plane perpendicular thereto. In that regard, it will be understood that a client device's provision of location and orientation data as set forth herein may be provided automatically to the user, to the server, or both. The client device 171 may also be equipped with various privacy settings, allowing the user to opt out of sending information about the device 171. For example, before providing the device's location to a remote server, the client device 171 allows the user to select an option whereby such geographic location information is not to be sent.

Although certain advantages are obtained when information is transmitted or received as noted above, aspects of the invention are not limited to any particular manner of transmission of information. For example, in some aspects, information may be sent via a medium such as an optical disk or portable drive. In other aspects, the information may be transmitted in a non-electronic format and manually entered into the system. Yet further, although some functions are indicated as taking place on a server and others on a client, various aspects of the system and method may be implemented by a single computer having a single processor.

The server 110 may include direction data 142 for generating turn-by-turn directions based on a plurality of route segments. Turn-by-turn directions may include text, audio, video, images, and maps. Each turn-by-turn direction and associated route segment may be further associated with one or more map tiles such that each turn-by-turn directions displayed with the one or more map tiles. It will be understood that turn-by-turn directions are not limited to instructions to make simple turns, for example, other directions may include continuing on a road, taking a particular exit, etc.

Server 110 may store map-related information 144, at least a portion of which may be transmitted to a client device. For example and as shown in FIG. 1, the server may store map tiles, where each tile comprises a map image of a particular geographic area. A single tile may cover an entire region such as a state in relatively little detail and another tile may cover just a few streets in high detail. In that regard, a single geographic point may be associated with multiple tiles, and a tile may be selected for transmission based on the desired level of zoom. The map information is not limited to any particular format. For example, the images may comprise street maps, satellite images, or a combination of these, and may be stored as vectors (particularly with respect to street maps), bitmaps (particularly with respect to satellite images), or flat files.

The various map tiles are each associated with geographical locations, such that the server 110 and/or client device are capable of selecting, retrieving, transmitting, or displaying one or more tiles in response to receiving one or more geographical locations.

Data 134 may also include route segments 138. Each route segment may be associated with one or more geographical locations. A given route between locations may comprise a plurality of route segments. By way of example only, route segments may be based on stretches of road between intersections, changes in road names, or turn instructions for the particular determined route. For example, if the route between location A and location C requires a turn at location B, the route consists of two route segments, namely the segment A-B and the segment B-C. Each segment may be associated with one or more turn-by-turn directions.

The system and method may process locations expressed in different ways, such as latitude/longitude positions, street addresses, street intersections, an x-y coordinate with respect to the edges of a map (such as a pixel position when a user clicks on a map), names of buildings and landmarks, and other information in other reference systems that is capable of identifying a geographic locations (e.g., lot and block numbers on survey maps). Moreover, a location may define a range of the foregoing. Locations may be further translated from one reference system to another. For example, the client 160 may access a geocoder to convert a location identified in accordance with one reference system (e.g., a street address such as "1600 Amphitheatre Parkway, Mountain View, Calif.") into a location identified in accordance with another reference system (e.g., a latitude/longitude coordinate such as (37.423021°, −122.083939°)). In that regard, it will be understood that exchanging or processing locations expressed in one reference system, such as street addresses, may also be received or processed in other references systems as well.

Figure 4:
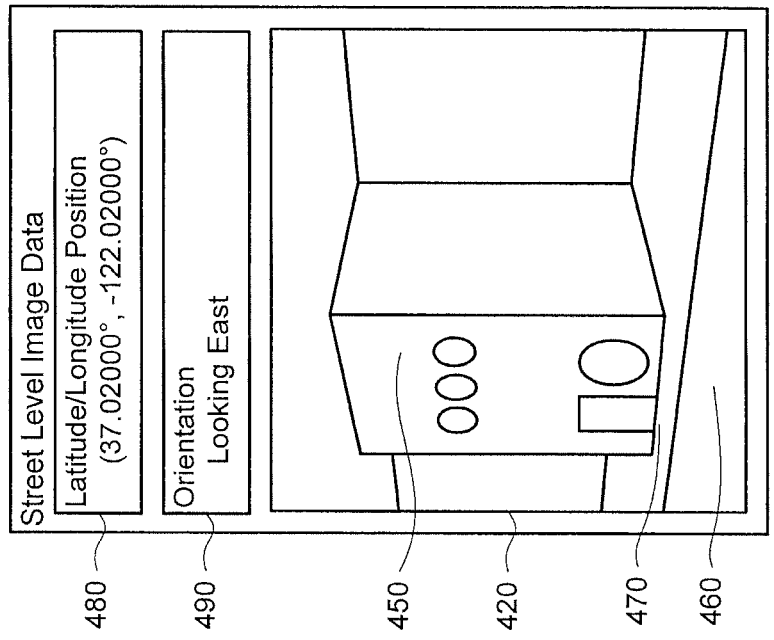
FIG. 4 is another illustration of street level image data.
Figure 3:
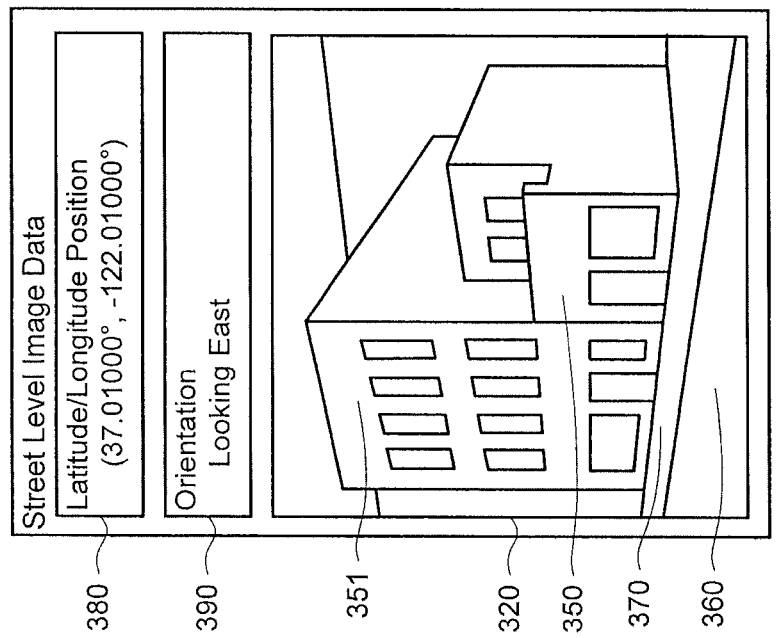
FIG. 3 is an illustration of street level image data.

The map database may also store data representing street level images 136. Street level images comprise images of objects at geographic locations, captured by cameras, in a direction generally parallel to the ground. Thus, as shown in FIGS. 3-4, street level images 320 and 420 may represent various geographic objects such as buildings 350-351 and 450, sidewalks 370 and 470, and streets 360 and 460, respectively, from a perspective of a few feet above the ground and looking down the street. It will be understood that while street level images 320 and 420 only show a few objects for ease of explanation, a typical street level image will contain as many geographic objects (street lights, mountains, trees, bodies of water, vehicles, people, etc.) in as much detail as the camera was able to capture.

The street level image may be captured by a camera mounted on top of a vehicle at or below the legal limit for vehicle heights (e.g., 7-14 feet) from a camera angle pointing roughly parallel to the ground. Street level images may also be provided to the server 110 via Internet listings or the client devices 160 and 170. For example, the images may be captured using an on-device camera 166, or a digital camera connected to the client device. Street level images are not limited to any particular height above the ground, for example, a street level image may be taken from the top of building. Panoramic street-level images may be created by stitching together a plurality of photographs taken from different camera angles.

Each street level image may be represented as a set of pixels associated with color and brightness values. For example, if the images are stored in JPEG format, the image will be displayed as a set of pixels in rows and columns, with each pixel being associated with a value that defines the color and brightness of the image at the pixel's location.

Street level image data 136 further associates each street level image with a location, or geo-tag, typically the latitude/longitude position of the camera when the image was captured. In that regard, the street level image data may associate the street level images 320 and 420 with latitude/longitude positions 380 and 480, respectively. If the image data is provided to the server 110 via a client device 160, the location information may be provided by the client device using an on-device GPS receiver 168.

In addition to being associated with geographic locations, street level images 136 are typically associated with information indicating the orientation of the image. For example, if the street level image comprises a typical photograph, orientation data 390 and 490 may store the camera angle as data representing an angle that is 90° east of true north and rises 2° from ground level (shown as simply "Looking East" in the figures). If the street level images are panoramic images, such as 360° panoramas centered at the geographic location associated with the image, the orientation may indicate the portion of the image corresponding with looking due north from the camera position at an angle directly parallel to the ground.

Street level images may also be stored in the form of videos, such as by displaying MPEG videos captured by an analog video camera or displaying, in succession, time-sequenced photographs that were captured by a digital still camera.

The server 110 may also access placemark information 140 identifying local businesses, clubs, or other objects or features associated with particular geographic locations. For example, a placemark may be associated with a name (such as a company name) or a description of the placemark (such as "fountain"). Each placemark may also be associated with one or more route segments, as well as content such as coupons, advertisements, user reviews, photos, or menus.

Figure 5:
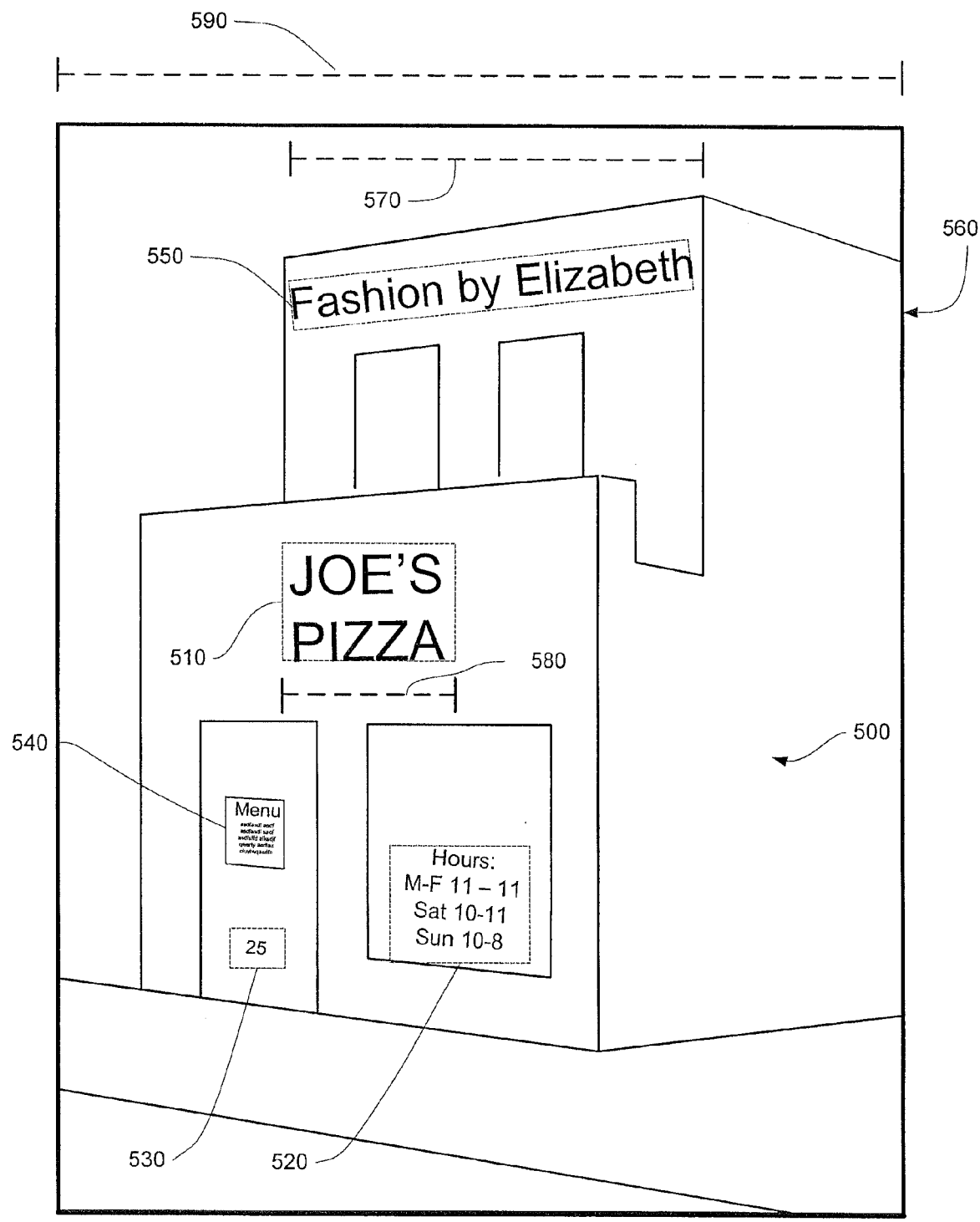
FIG. 5 is a further illustration of a street level image.

In addition, each placemark may be associated with signage data that visually identifies the placemark from one or more locations along the route segments. Signage may include any text, design, or logo that appears at the placemarks location. For example, as shown in FIG. 5, the signs for "Joe's Pizza" 510 and "Fashion by Elizabeth" 550 are each forms of signage that may be associated with the placemarks for the businesses at that location.

Placemarks may refer to other geographically-located objects in addition to or instead of businesses. For example, they may also include points of interest ("POI"), individuals' homes, landmarks, roads, bodies of land or water, items located in a store, items that can be moved to different locations etc. Therefore, while many of the examples below refer to businesses, most aspects of the system and method are not limited to any particular type of placemark.

The server 110 may include modules or instructions 132 that allow for signage detection within the geo-tagged image data 136. Specifically, the server 110 may detect potential text regions in an image, such as regions 510, 520, 530, 540, and 550 in FIG. 5. The server then performs a process for recognizing the text strings using optical character recognition (OCR) technology. The server may also search for known placemarks near the location of the geo-tagged image and extract phrases from information related to the signage for the nearby placemarks (e.g., name, category, phone number, and other information that are expected to be found on places such as store-fronts and signs). The server 110 then compares the text strings recognized in the image with the phrases extracted from the data for nearby placemarks. If any placemark data matches a text string in the image, the placemark may be associated with that particular geo-tagged image. In addition, all images that show at least part of the placemark's signage may be tagged as being associated with a particular placemark.

It should be appreciated that the server 110 may be provided with an individual geo-tagged image of placemarks (also called the "individual image scenario"). Alternatively, the server may have access to a large collection of images showing placemarks in a general area (also called the "image corpus scenario"), such as pictures taken by a camera car while touring around an area.

Figure 6:
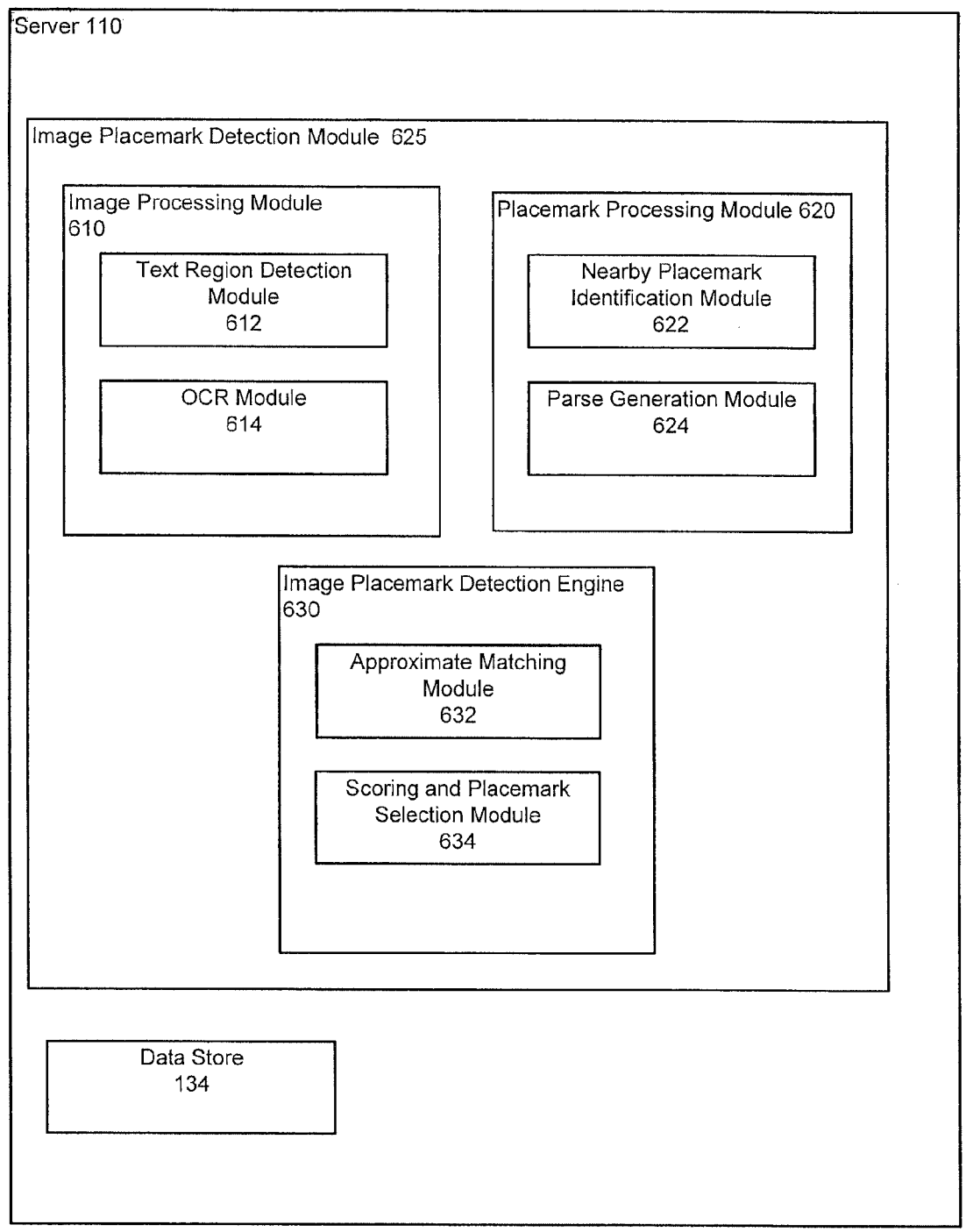
FIG. 6 is a block diagram in accordance with an aspect of the invention.

FIG. 6 is a high-level block diagram illustrating a view of modules used for image placemark detection according to one embodiment. It should be appreciated that the modules described herein may take the form of a processor executing instructions. Some embodiments of the image placemark detection module 625 have different and/or other modules than the ones described herein. Similarly, the functions can be distributed among the modules in accordance with other embodiments in a different manner than is described here. In addition, each module in FIG. 6 may be implemented by a single processor or by a set of processors operating in parallel to further improve efficiency. As illustrated, the image placemark detection module 625 may include an image processing module 610, a placemark processing module 620, an image placemark detection module 630, and a data store 134.

The image processing module 610 processes received geo-tagged images to detect text strings presented in the images. These text strings are often for signage that is related to a particular placemark. Accordingly, the text strings recognized in an image are used by the image placemark detection module 625 to identify placemarks in that image. Thus, if more text strings are recognized in the image then there will be more matching results for the placemark identification to be based. In addition, because of factors such as lighting, angle, shading, and font, text strings in images often are hard to locate and/or recognize. Accordingly, in one embodiment, in order to achieve more informed placemark identification and accommodate factors affecting text recognition, the image processing module 610 adopts an over-inclusive approach to recognize more text strings in the image, even at the cost of a potential higher error rate. As shown, the image processing module 610 includes a text region detection module 612 and an OCR module 614.

The text region detection module 612 analyzes an image to detect the presence of a text string and identify a portion of the image (e.g., a rectangular-shaped bounding box) that includes the text string. The identified portion of the image is called a text region. In one embodiment, in order to be overly inclusive and detect more text strings in an image, the text region detection module 612 applies a variety of distinctive text/character detection algorithms known in the related fields to identify text regions in the image. For example, the text region detection module 612 may consider visual features such as Histogram of oriented gradients, edge contrast features, transition/run-length densities, geometrical properties, and connected component based features in detecting text regions in the image.

The OCR module 614 converts (or translates) text strings inside the detected text regions into editable text (hereinafter called OCR'ed text strings). The OCR module 614 processes the text regions using computer algorithms and generates corresponding OCR'ed text strings. In addition, the OCR module 614 calculates a confidence score that measures a quality of the OCR'ed text strings. In one embodiment, to be overly inclusive, the OCR module 614 applies a variety of OCR engines (or algorithms) and generates multiple alternative OCR'ed text strings along with their corresponding confidence scores for a same text region. Examples of the OCR engines include Abbyy FineReader, Nuance OmniPage, and Open Source Tesseract. The resulting OCR'ed text strings are collectively called a "pool of texts." The pool of texts may include OCR'ed text strings recognized in an individual image (e.g., for the individual image scenario) or multiple images (e.g., for the image corpus scenario).

The placemark processing module 620 generates a collection of phrases (also called a "pool of phrases") for each known placemark near the geographical location indicated by the geo-tag associated with an image (also called the "image location"). By limiting the source of the pool of phrases to placemarks that are near the image location, the placemark processing module 620 effectively excludes irrelevant placemarks and thereby enhances computational efficiency and result quality. As shown, the placemark processing module 620 includes a nearby placemark identification module 622 and a phrase generation module 624.

The nearby placemark identification module 622 extracts the latitude and longitude coordinates of the image location from the geo-tag, and identifies placemarks located near the image location. For example, the nearby placemark identification module 622 searches for placemarks located within a radius around the image location in a placemark database, and identifies the nearby placemarks in the search results. The radius may be defined by the accuracy of the image geo-tag or predetermined (e.g., 1,000 feet). In one embodiment, the placemark database is a relational database and includes some or all of the following information for known placemarks in a geographic region: (1) geographic locations (e.g., latitude and longitude coordinates), (2) names, (3) categories (e.g., RESTAURANT, PIZZA, BANK, and INSURANCE), and (4) phone numbers. The placemark database may include a mechanism for rapidly retrieving placemarks based on geographical information (e.g., within a radius of a geographical location defined by latitude and longitude coordinates). The nearby placemark identification module 622 retrieves information related to the nearby placemarks (e.g., name, category, phone number) from the placemark database.

The phrase generation module 624 extracts (or generates) a set of n-grams from the retrieved placemark information associated with the nearby placemarks. An n-gram (also called a "phrase") is a subsequence of n items (e.g., characters, words) from a given sequence. The n-grams extracted by the phrase generation module 624 can be at the character level (e.g., n consecutive characters in the text) or at the word level (e.g., n consecutive words in the text), and can overlap in the original text. The phrase generation module 624 adds all n-grams generated for all nearby placemarks identified by the nearby placemark identification module 622 into the pool of phrases. In one example, the phrase generation module 624 extracts word level n-grams for the value of n ranging from 1 to 5. That is, the pool of phrases includes any stretch of full words within the retrieved placemark information, up to five words long.

The image placemark detection module 630 compares the OCR'ed text strings in the pool of texts with the n-grams in the pool of phrases for matches, and identifies placemarks in the images based on the matching results. As described earlier, in one embodiment the image processing module 610 adopts an over-inclusive approach to recognizing text strings in an image. To accommodate the potential high OCR error rate, the image placemark detection module 630 performs the comparison in a manner that allows errors in the OCR'ed text strings. As shown, the image placemark detection module 630 may include an approximate matching module 632 and a scoring and placemark selection module 634.

The approximate matching module 632 compares all n-grams in the pool of phrases with all OCR'ed text strings in the pool of texts to find any appearance of an n-gram as a substring of any of the OCR'ed text strings. In one embodiment, in order to further enhance efficiency, instead of comparing all n-grams in the pool of phrases with all OCR'ed text strings in the pool of texts, the approximate matching module 632 utilizes hashing and/or filtering methods to limit the number of comparisons. In one embodiment, to account for errors in the OCR'ed text strings, the approximate matching module 632 allows some edit-distances (e.g., Levenshtein distance) between the text strings and the n-grams being compared and still considers them matching. For example, a 75% or higher matching rate (e.g., no more than 1 mismatching character in every four characters) may be considered a match. A match between an OCR'ed text string and an n-gram is considered a piece of evidence towards the placemark associated with the n-gram appearing (or referenced) in the image associated with the matching OCR'ed text string.

The scoring and placemark selection module 634 calculates scores for placemarks by combining evidence indicating that the placemark is found in an image. In one embodiment, each match detected by the approximate matching module 632 is assigned a weight based on factors such as: the text field (or type) from which the matching n-gram is extracted (e.g., placemark name, category, phone number), the length of the matching n-gram (i.e., the value of n), the OCR confidence score associated with the matching OCR'ed text string recognized in the image, the edit-distance of the match, and the prevalence of the words/terms in the matching n-gram within the language (e.g., "RESTAURANT" is weaker evidence than "PARADISE") or the local area (e.g. "NEW YORK" is weaker evidence in the New York City area than "Chrysler Building"). For example, a match for an n-gram extracted from the placemark name may be giving a higher weight than a match for an n-gram extracted from the category of the placemark. The score is generated based on factors such as the number of matches, the weight of each match, and the distance between the image location and the location of the placemark. The algorithm to calculate the weight for each match and/or the score for each placemark can be generated using heuristics and/or machine-learning techniques. Some example heuristics include adjusting the confidence scores for the OCR'ed text to be values between 0 and 1 with 1 indicating a high confidence in the accuracy of the OCR'ed text and 0 indicating a low confidence, and assigning higher weights for matches occurring in the placemark names than matches in the placemark categories.

For the individual image scenario, the scoring and placemark selection module 634 generates one score for each placemark near a target image, and selects an placemark for the image based on the scores (e.g., the placemark associated with the highest score) as the placemark in the image. For the image corpus scenario, the scoring and placemark selection module 634 creates image-placemark pairs by pairing each image in the image corpus with each placemark near the image location of that image, and generates one score for each image-placemark pair. The scoring and placemark selection module 634 may select an image for each placemark based on the scores (e.g., the image of the image-placemark pair with the highest score for that placemark) as the representative image for that placemark.

The data store 134 stores data used by the image placemark detection module 625. Examples of such data include the placemark database, the pool of texts, the pool of phrases, and the image itself.

Figure 7:
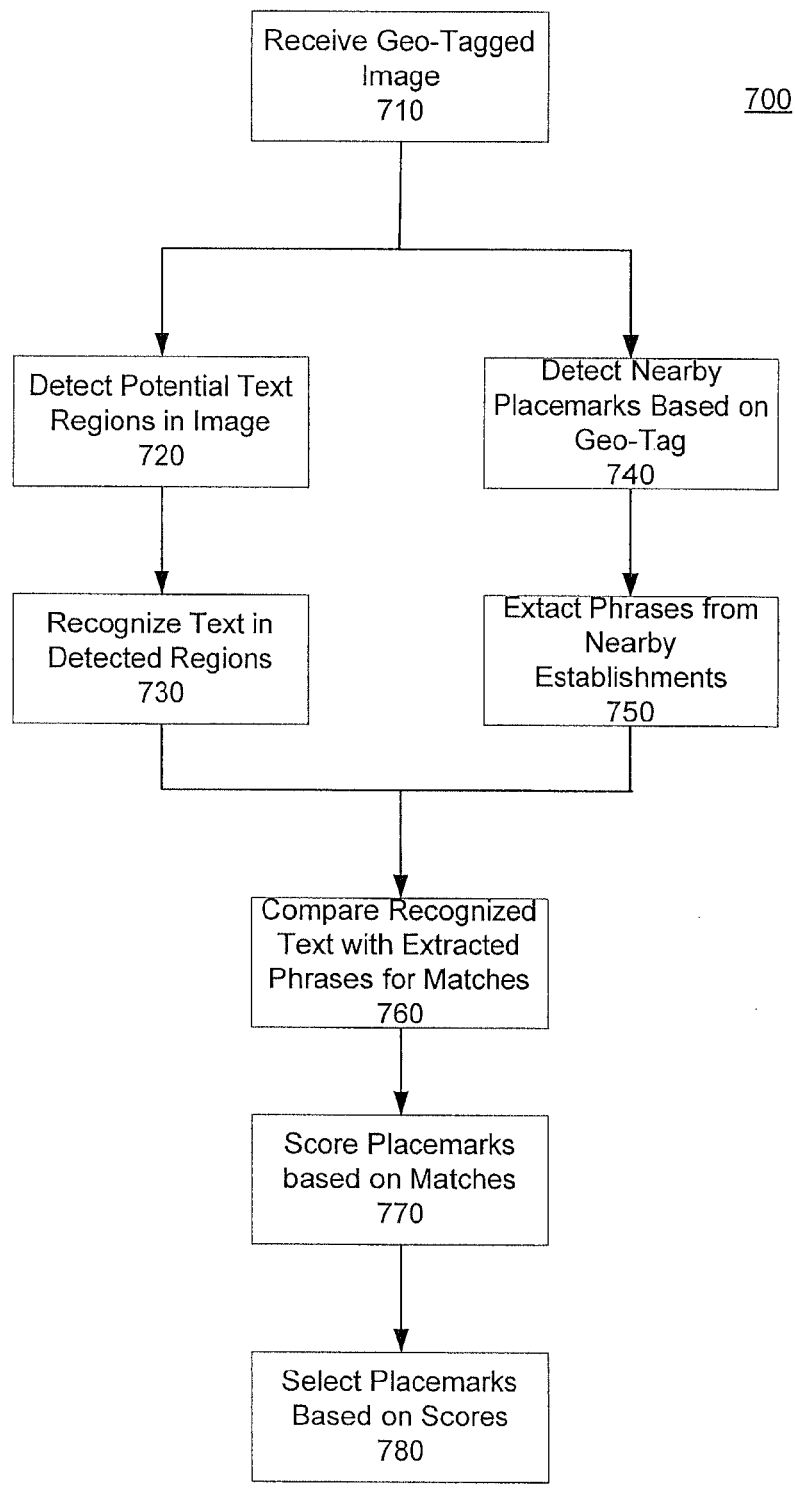
FIG. 7 is a flow chart in accordance with an aspect of the invention.

FIG. 7 is a flow diagram illustrating a process 700 for the server 110 to identify a known placemark in a geo-tagged image, according to one embodiment. While the process is shown in a certain order, the steps may be performed in a different order, and steps may be added or omitted. Other embodiments can perform the steps of the process 700 in different orders.

Initially, the server 110 receives a geo-tagged image (Block 710). The server 110 detects potential text regions in the image by applying a variety of distinct text detection algorithms (Block 720), and recognizes text strings in the detected regions using OCR technology (Block 730). Separately, the server 110 detects nearby placemarks by searching in the placemark database for known placemarks located within a radius around the image location specified in the associated geo-tag (Block 740). The image server 110 extracts phrases from the nearby placemarks by generating overlapping n-grams from the information associated with the nearby placemarks (Block 750). When repeated queries (e.g., visual search queries) are expected from the same or a nearby location, the search results and/or extracted phrases may be cached between the queries to further enhance efficiency.

The server 110 compares the text strings recognized in the image with the n-grams generated for the nearby placemarks for approximate matches (Block 760), and generates a score for each nearby placemark based on the matching n-grams associated with that placemark and factors such as the distance between the image location and the location of the placemark (Block 770). The server 110 then associates a placemark as the known placemark appearing, or referenced, in the geo-tagged image having the highest score (Block 780). In addition, the server 110 associates the matching text region as being signage for that particular placemark. Alternatively, the server 110 may only associate a placemark with the geo-tagged image if the score generated in Block 770 is above a predefined threshold.

In one embodiment, the server 110 may process a large collection of images in a batch process (e.g., for the image corpus scenario). For example, the server 110 will recognize OCR'ed texts in the images, generate the n-grams for all placemarks in the general area of the collection of images, and then analyze the images in a sequence based on their image locations, such that the applicable pool of phrases are relatively stable between the adjacent images (since the image locations are relatively close).

In another embodiment, the server 110 may identify placemarks in video streams or video frames. In yet another embodiment, in order to identify known placemarks in an image, in addition to matching OCR'ed text recognized in the image, the server 110 also matches graphical components in the image (e.g., logos) to a database of known graphical marks associated with placemarks using image-matching techniques, matches the image against a database of real-estate listings, matches house-numbers identified in the image to addresses of the placemarks, and/or takes into consideration manual placemark identification.

An image may contain more than one placemark having visible signage. For example as shown in FIG. 5, the text strings found in text regions 510 and 550 each relate to the distinct placemarks of "Joe's Pizza" and "Fashion by Elizabeth". Accordingly, the separate placemarks of Joe's Pizza and Fashion by Elizabeth may each be associated with the image in FIG. 5, provided that the score for each text region 510 and 550 is above any predefined threshold.

Figure 8:
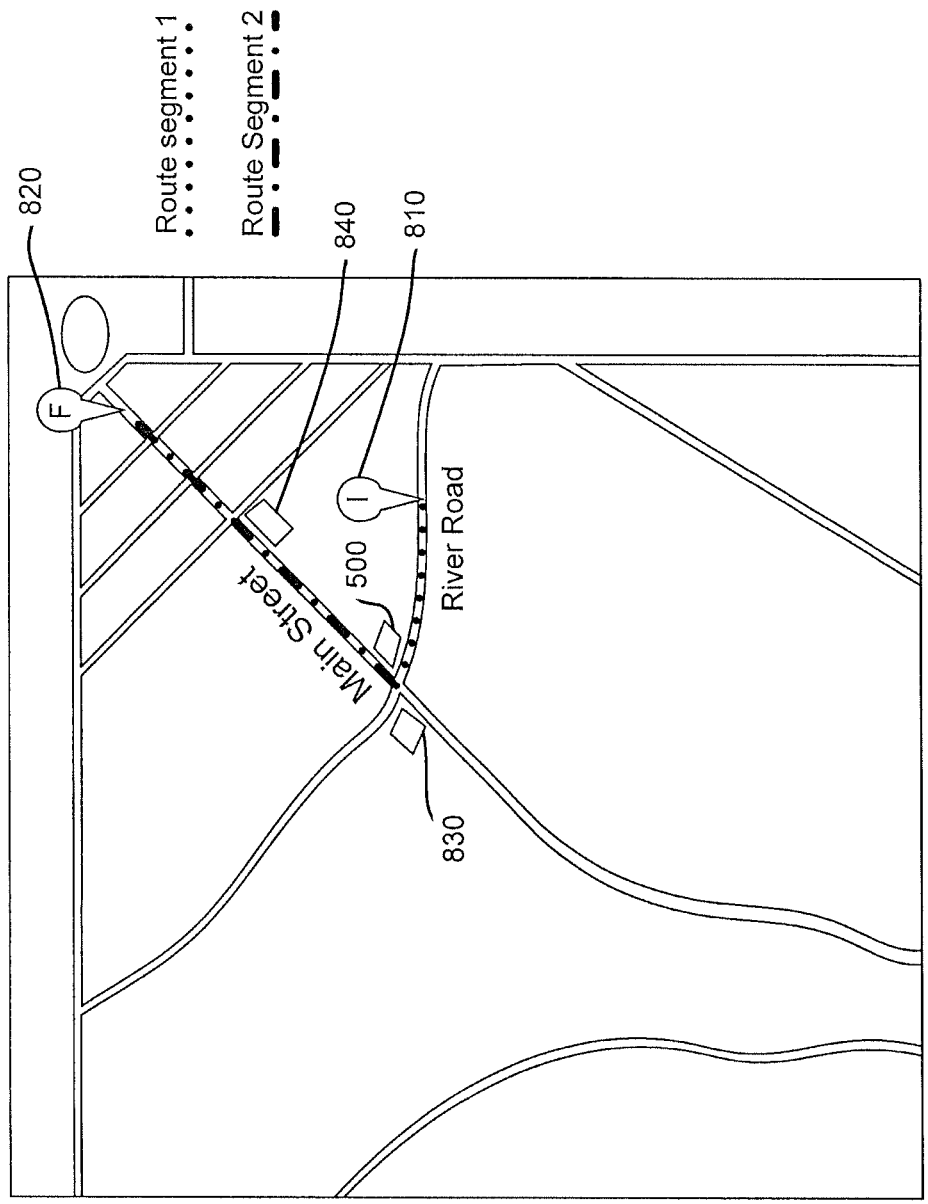
FIG. 8 illustrates a map for use with aspects of the invention.

Once the geo-tagged images have been associated with the placemarks visible within the image, the data may be stored on the server 110 as image data 136 and may be used in connection with providing turn-by-turn navigation to the client devices 160 and 170. For example, FIG. 8 illustrates a map that provides a route between a starting point 810 on River Road and a destination 820 on Main Street. The route is broken into two segments. Route segment 1 includes a portion of River Road, while route segment 2 includes a portion of Main Street. Along the route, there are several buildings 500, 830, and 840 that could act as placemarks for providing a user with navigation. For example, a user traveling from point 810 to destination 820 will be directed to take a right turn on to Main Street at either building 500 or building 830. In addition, if building 500 is the building shown in FIG. 5, the turn-by-turn could instruct the user to turn right at a specific placemark, such as "Joe's Pizza", or alternatively at "Fashion by Elizabeth". This would help assure that the user of a client device 160 stays on the desired route, and does not miss the required right turn. Preferably, the placemark provided as part of the turn-by-turn directions will be easily identifiable and visible to a user, as the user approaches Main Street from River Road. As set forth below, the system 100 is operable to select placemarks that are more easily identifiable along a desired route.

Figure 9A:
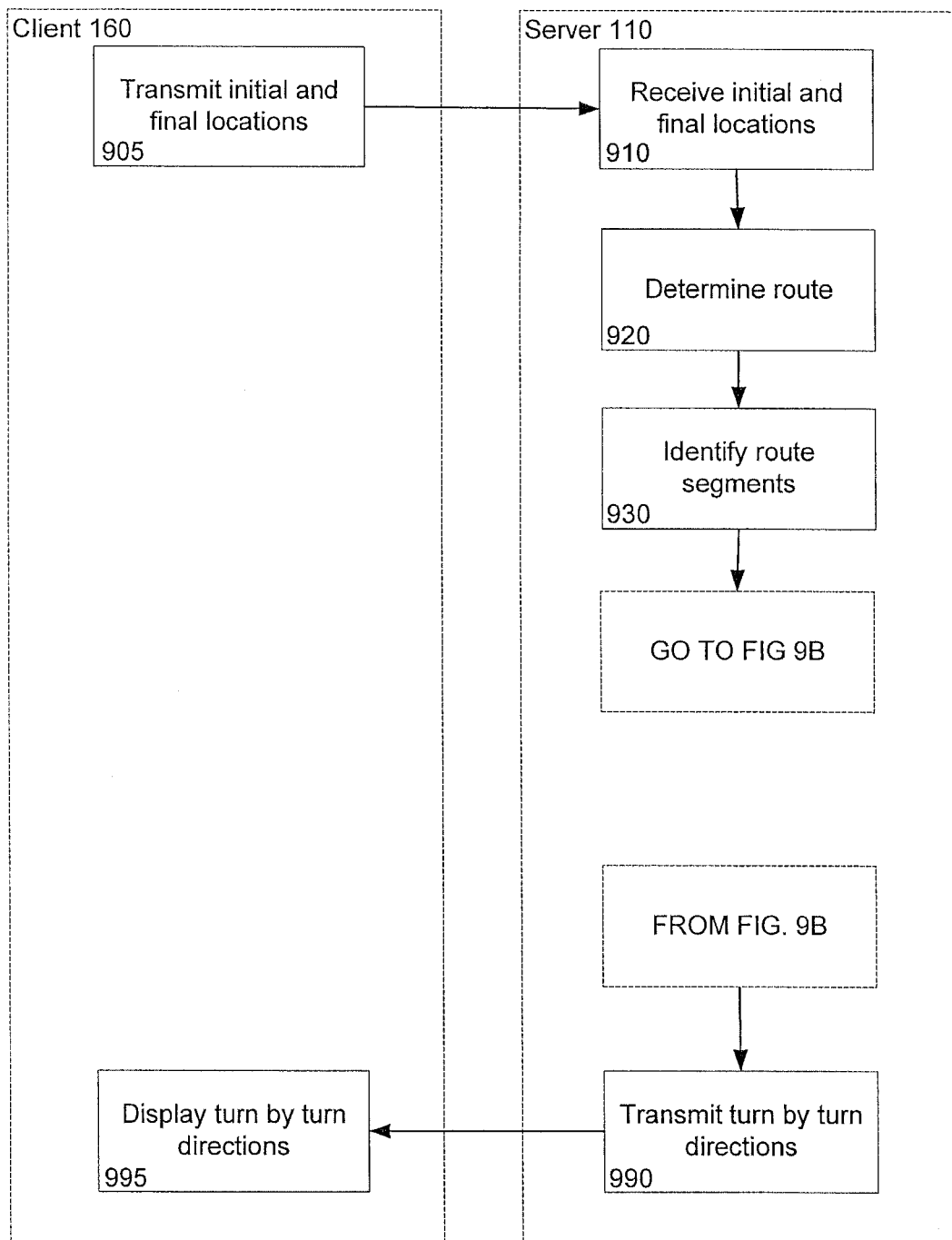
FIGS. 9A and 9B are flow diagrams in accordance with an aspect of the invention.
Figure 9B:
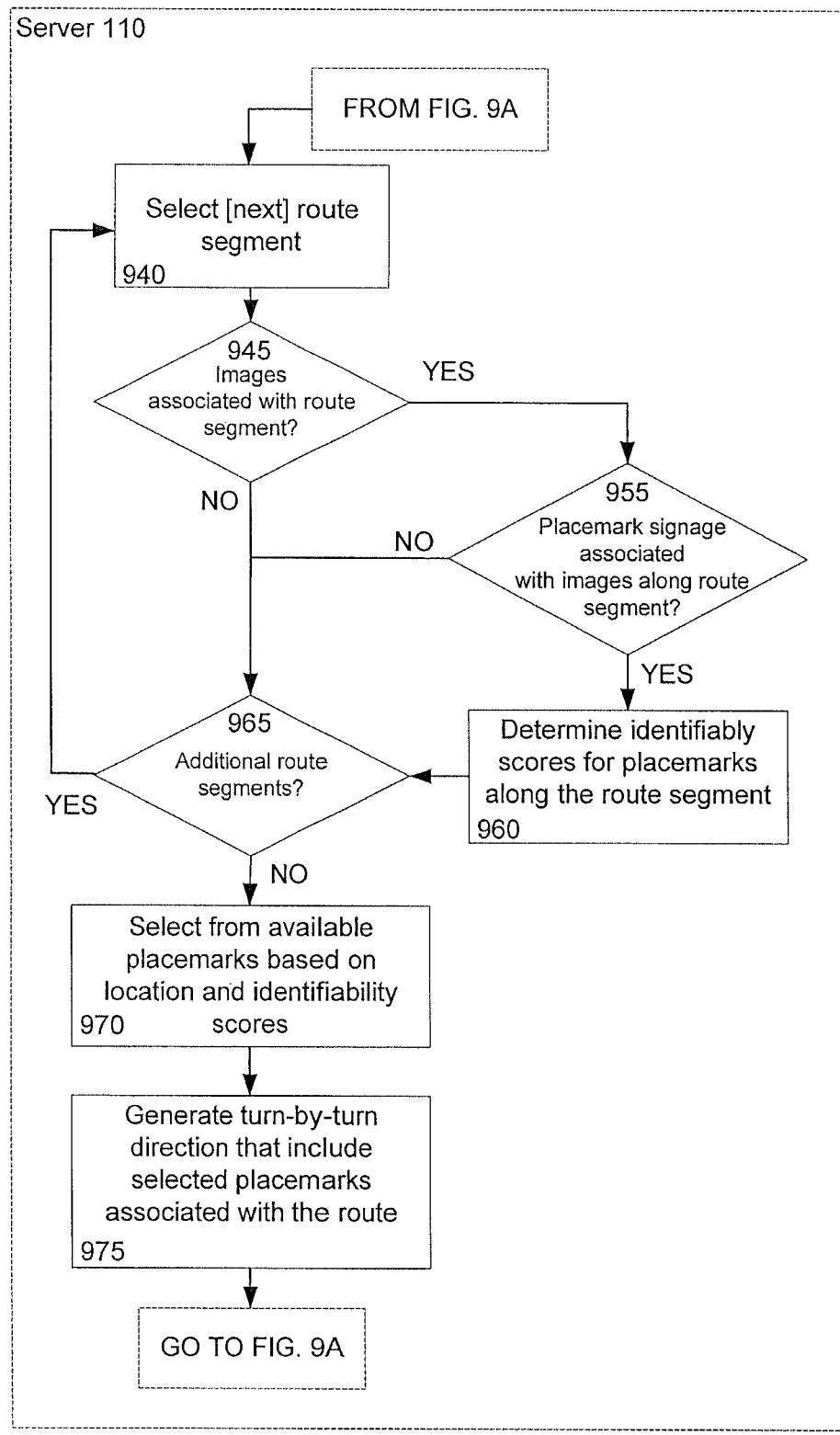

FIGS. 9A and 9B depict an embodiment which will be described in detail below. It will be understood that the operations do not have to be performed in the precise order described below. Rather, various steps can be handled in a different order or simultaneously. For example, as shown in block 905 of FIG. 9A, a client device, such as client device 160, may transmit initial and final locations. Then, at block 910, a server, such as server 110 may receive the initial and final locations and determine a route between the locations as shown in block 920. At block 930, server 110 may identify route segments associated with the route.

Turning to FIG. 9B, server 110 may select a route segment as shown in block 940. Then, at block 945, the server may determine whether there are geo-tagged images associated with any locations along the selected route segment. If there are such images, at block 955 the server 110 will determine whether any of the images have placemark signage that is associated with it.

If images with placemark signage exist along the route segment, the server 110 will determine the identifiability scores for each placemark (block 960), as described below.

If there are additional route segments, as shown in block 965, the server will return to block 940 and select the next route segment of the route. As provided in block 970, if there are no additional route segments, sever 110 selects from the available placemarks based on their location and identifiability scores. Then as shown in block 975, the server generates turn-by-turn directions that include the selected placemark(s) associated with the route. Returning to FIG. 9A, the turn-by-turn directions are transmitted to the client device 160, as shown in block 990, and are displayed by the client device 160, as shown in block 995.

While the process in FIGS. 9A and 9B is shown in a certain order, the steps may be performed in a different order, and steps may be added or omitted. For example, the determination of the identifiability scores for placemarks may be performed prior to the server 110 receiving a request for turn-by-turn directions from the client device. In other words, the server 110 may use stored images to calculate the placemark identifiability scores for various locations, and may select the best placemarks to use for these locations prior to determining the route that will be traveled by a particular user. Accordingly, in some embodiments, blocks 960 and 970 may be performed prior to blocks 905 and 910.

Aspects of the invention will now be described in greater detail. As noted above, a client device may transmit a request for turn-by-turn directions between two or more locations. As shown in FIG. 8, a user may identify an initial location 810 and a final location 820, or, in another example, the user may identify a final location and the client device may determine the initial location, for example GPS coordinates. As noted above, locations may be provided in any number of forms including street addresses, points of interest, or GPS coordinates of the user device.

Using the process described in FIG. 7 for the initial location 810 and final location 820 of FIG. 8, the server will identify the route as including route segment 1 and route segment 2. In addition, the server 110 will identify buildings 500, 830, and 840 as being placemarks associated with the route. The association of placemarks with a particular route may be performed by the server 110 accessing the placemarks' geolocation data 140, or by identifying placemarks that have street addresses corresponding to a portion of the route.

Once the server 110 has identified the placemarks associated with the route, the server may access the identifiability score for each of the placemarks along the route segment. It is the identifiability score that is used, at least in part, to determine which placemarks are displayed to a user in connection with the turn-by-turn directions. The identifiability score may include one or more factors relating to either the nature of the placemark, or the image of the placemark along the route.

The identifiability score may be pre-calculated by the server 110 by determining whether any of the placemarks 500, 830, or 840 have signage that is visible from the route segment, prior to the server receiving a specific request for turn-by-turn directions from the client device 160. In order to make this determination, the server 110 accesses the information obtained from the geo-tagged street level image data 136. As previously described, the geo-tagged image data 136 contains information regarding the image's geographic location, as well as the orientation, or direction, the camera was facing when the image was taken. Using this information, the server 110 may identify the subset of images that were taken along the selected route segment. In addition, the server 110 may limit the subset of images to those that have an orientation that is within a predefined angle in relation to the direction of travel along a route. For example, if a route would require a user to travel due West, the server may limit the images it considers as being associated with the route to those images that have an orientation within 90 degrees of due west. In this way, the server 110 will avoid relying on images that have an easterly orientation, and which may not be visible to a user traveling along the route.

One of the factors for a placemark's identifiability along a route is the visibility score of the placemark's signage. Often times the signage for a placemark, when viewed from the route, might be unclear or may be wholly or partially blocked by objects, such as trees or buildings. The visibility score accounts for this by providing greater weight to placemark signage that can be easily read from the route. In determining the visibility score of the placemark signage, the server 110 uses the OCR'ed image data 136. As described above, server 110 creates text regions for the OCR'ed image, and may match the text within those text regions to data relating to the placemark. The visibility score for a placemark may be measured on a scale of 0 to 1 (or some other range) and based on the fraction of characters within the OCR'ed text region that match the characters in the placemark's name. For example, if a placemark has a name that is 10 characters long, and the OCR'ed text for the image of the placemark signage matches 9 of ten characters, then the visibility score for the placemark in that image will be 0.9 (i.e. 9 divided by 10).

Another factor that may be used to determine a placemark's identifiability is the prominence score for the placemark's signage. The prominence of a placemark's signage is defined by the spatial angle covered by the signage within the image, which may be determined using one of several alternative metrics. For example, FIG. 5 illustrates an image having bounding boxes 510 and 550 around the signage for Joe's Pizza and Fashion by Elizabeth, respectively. The bounding boxes 510 and 550 represent the text regions identified by the server 110 as part of the OCR process described above. The prominence score for each placemark may be calculated as the fraction of the image width that is covered by the bounding box. For example, the bounding box 550 for "Fashion by Elizabeth" has a width 570 that is half of the width 590 of the entire image 560, while the bounding box 510 for "Joe's Pizza" has a width 580 that is ⅕ the width 590 of the entire image 560. Accordingly, for image 560, the prominence score of the "Fashion by Elizabeth" placemark is 0.5, while the prominence score for the "Joe's Pizza" placemark is 0.20. Alternatively, the prominence score may be calculated based on the spatial angles that create the area of the bounding box for the placemark signage relative to the spatial angles that create the area of the entire image. As yet another alternative, if information regarding the depth is collected as part of the street level image data 136, the prominence score may be calculated by determining either the physical width or physical area of the signage. This would be performed by multiplying the spatial angle, or angles, of the signage's bounding box by a factor representing the distance of the placemark signage from the camera's location.

Yet another factor that may be used in determining the identifiability score of a placemark relates to the notoriety of the placemark in question. If the placemark in question is a business, notoriety may include information regarding the size of the business, such as the number of locations or offices the business has, whether the business is located across the entire country. In addition, notoriety may be based, at least in part, on the number of results that contain the placemark's name when a categorical search query is performed, such as "restaurants New York City". Notoriety could also include a metric for how well known the business is among the general public. For example, in FIG. 5, if Fashion by Elizabeth is a nationally known brand of clothing, with retailers across the country, and Joe's Pizza is a local restaurant with only a few locations, then the server 110 may increase the identifiability score of Fashion by Elizabeth relative to Joe's Pizza. For example, in one possible embodiment, nationally known placemarks may have their identifiability score multiplied by a factor of 2, while locally known placemarks will not have any multiplication factor applied. The server 110 may store the information regarding the notoriety of a placemark as part of the placemark data 140. In addition, the server 110 may store, as part of the placemark data 140, a designation relating to whether the placemark is well known internationally, nationally, regionally, or locally. The notoriety score, as is also the case for the visibility and prominence scores, may be normalized to a value between a particular range, such as between the range of 0 and 1.

The identifiability score for a placemark along a route segment may include one or more of the factors discussed above in any number of ways. In one embodiment, the identifiability score may comprise an array of several different values, such as a visibility score, a prominence score, and a notoriety score. For example, the identifiability score (IDENT) may be calculated using a linear combination of the visibility score (VIS), prominence score (PROM), and notoriety score (NOTO). In addition each score contained in the linear combination may be weighted by a different value, so as to provide the following equation: IDENT=w_1*(VIS)+w_2*(PROM)+w_3*(NOTO). The weight values w_1, w_2, and w_3 may each be a fraction, and their summation may equal 1. For example, the weight values used may be w_1=4/13, w_2=8/13, and w_3=1/13.

In another embodiment the server 110 may add a placemark's visibility score with the placemark's prominence score, and then increase this combined score by the value based on the placemark's notoriety score. For example, assuming that the placemark signage for Fashion by Elizabeth, as illustrated in FIG. 5, has a visibility score of 1 (i.e., all characters in the text region matched the placemark name) and a prominence score of 0.5 (the width of the signage is half the width of the image as a whole), then these scores could be added together so as to create a combined score of 1.5. If Fashion by Elizabeth is a nationally known brand, the server 110 could then multiply this combined score by a predetermined factor of 2, so as to create an identifiability score of 3. It should also be appreciated that the various factors making up the identifiability score may be weighted differently, regardless of the combination used to create the score.

As provided in FIG. 9B, the server 110 selects placemarks based on their location and identifiability scores (block 970) and then generates turn-by-turn directions that include the selected placemarks (block 975). In selecting placemarks, the server 110 may first determine locations along the route that will require the user to act in some way, such as by making a turn or changing lanes. These locations will often be associated with the user traveling from one route segment to another. For example, as illustrated in FIG. 8, as a user travels from point 810 to point 820, the user will have to make a right turn when proceeding from route segment 1 to route segment 2. To help assure that the user makes the required right turn, the server 110 may select the most identifiable placemark that would be visible to a user who approaches route segment 2 from route segment 1.

It should be appreciated that the server 110 may select from potential placemarks irrespective of whether each of the placemarks has an associated image. Specifically, some placemarks do not have associated signage that would allow for a visibility or prominence score, but are well-known places. For example, the Eiffel Tower, due to its notoriety, may be used in provided turn-by-turn directions, despite a lack of signage designating the Eiffel Tower.

In many instances, the server 110 will have access to numerous geo-tagged images that represent different locations along a particular route segment. In addition, the identifiability score of a particular placemark will change depending on the image's location and orientation. Accordingly, it would be preferable for the identifiability score of a placemark to be based on an image that has a geographic location close to locations where the user would need to identify the placemark in order to make the desired action (e.g., turning right on to route segment 2 from route segment 1). To achieve this, the server 110 may determine the identifiability score for placemarks based on images and placemarks that have a geographic location that is within a predetermined distance from a particular location (e.g., an intersection) along the route. In one example, this predetermined distance may be anywhere on the order of a foot to a mile or more. In addition, the server 110 may limit the identifiability scores to images having an orientation similar to the direction of travel, such as by requiring that the image be within 90 degrees of the direction of travel. Alternatively, the placemark's distance from the route could be included as a separate factor in the identifiability score.

For example, in providing a placemark associated with the right turn from route segment 1 to route segment 2 of FIG. 8, the server 110 may be operable to select placemarks based on their identifiability scores in images that are located along route segment 1 and that are predetermined distance, such as 0.1 miles, from the intersection of route segment 1 and route segment 2. FIG. 5 is an example of such an image. The server 110 may then select between Fashion by Elizabeth and Joe's Pizza based on which of the two placemarks has the higher identifiability score.

In an alternative embodiment, the server 110 may access numerous images taken at several different locations along a route, in order to determine the placemark having the highest identifiability score. In addition, the server 110 may access several different images and then average the identifiability score of a placemark. For example, the server 110 access the identifiability score for the placemarks contained in all of the images along a route that are within a quarter of a mile of an intersection, and then use the placemarks' average identifiability score to determine which placemark is to be selected for use in the turn-by-turn directions.

Figure 10A:
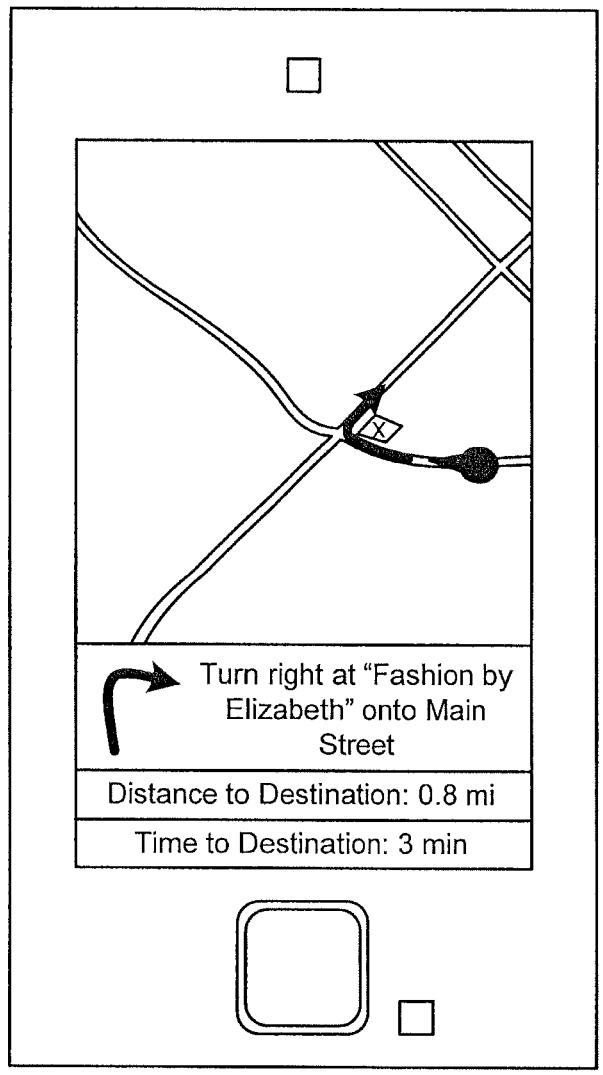
FIGS. 10A and 10B illustrate turn-by-turn directions as displayed on client devices in accordance with aspects of the invention.
Figure 10B:
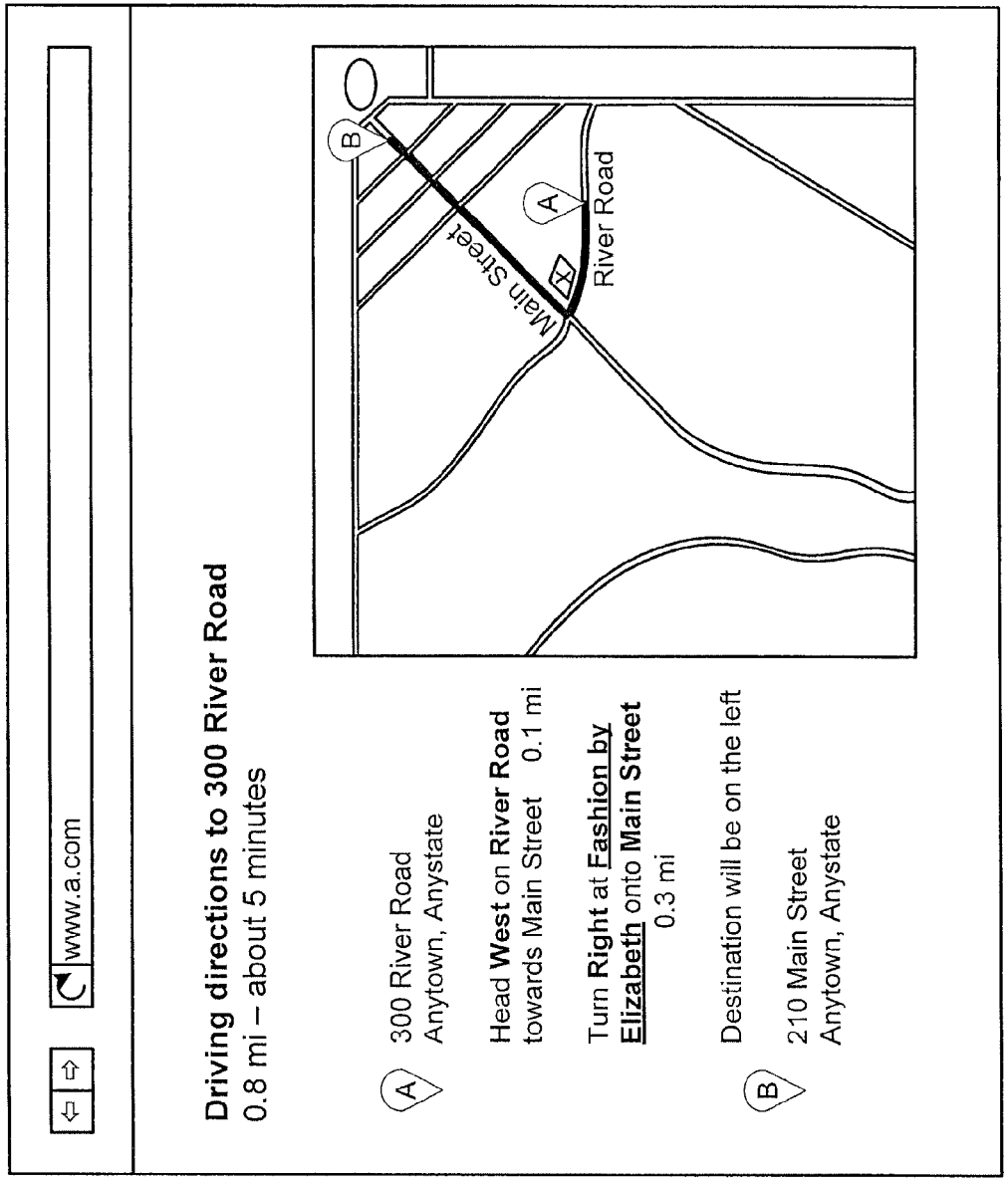

As described above in FIGS. 9A and 9B, the server generates turn-by-turn directions that include selected placemarks (block 975). Those turn-by-turn directions are then transmitted to and displayed, or otherwise presented, by a client device 160 (blocks 990 and 995). FIGS. 10A and 10B illustrate examples of what may be displayed by a client device 160, in accordance with the server 110 generating a turn-by-turn direction based on the inclusion of the placemark for Fashion by Elizabeth. In alternative embodiments, the turn-by-turn directions displayed on the client device 160 may include an image of the placemark (such as the image in Figure 5). In addition, the placemark may include links to various URLs. For example, as shown in FIG. 7B, the text "Fashion by Elizabeth" includes a hyperlink to a network location such as the website for Fashion by Elizabeth.

Figure 11:
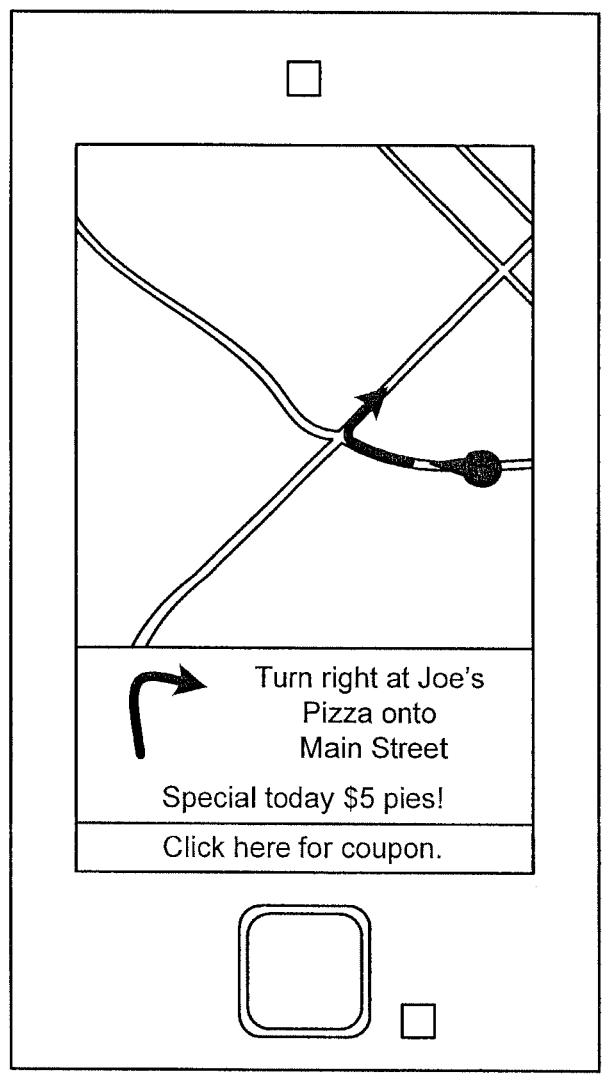
FIG. 11 illustrate turn-by-turn directions as displayed on a client device in accordance with aspects of the invention.

In one embodiment, the server may incorporate additional content into the turn-by-turn direction for the route segment. For example, as shown in FIG. 11, the server may generate a turn-by-turn direction which includes a link to a coupon. In another example, the turn-by-turn direction may display the actual coupon. In addition, the turn-by-turn directions may be provided by the client device 160 audibly. The client device 160 may also present options that allow the user to select the manner in which the turn-by-turn directions are presented, as well as the content included with the directions. For example, the user may have the option of turning off audible directions, or the option of having audible directions that include the name of selected placemarks. Although the example described above included placemarks located proximate to an intersection, it will be understood that directions may also include placemarks located anywhere along a route. In particular, turn-by-turn directions may include an intermediate direction that incorporates a placemark. For example, for route segment 2 in FIG. 8, if building 840 contains signage for the placemark "Smith's Diner", and has the highest identifiability score in a predefined area, the associated turn-by-turn direction may include text or audio such as "continue north along Main Street, you will pass Smith's Diner on the right."

In another embodiment, the server may conduct an action based on the location of the client device. For example, a client device may periodically send location information, such as GPS coordinates, to server 110 as the client device moves along the route. As the user approaches a turn or the next route segment, server may notify the user of a placemark based on the placemark's identifiability score, as determined from nearby geo-tagged images that have been stored on the server.

In another embodiment, the server may provide a client device 170 with all of the turn-by-turn directions at once. In this way, if the client device 170 is not a mobile device (e.g., a desktop PC), the user may send the directions to another device, or print the directions, prior to proceeding on the route.

In yet another embodiment, the placemark signage used to determine the identifiability score may contain graphical components (e.g., logos) that are associated with a placemark. In this instance the same identifiability score factors may be used, however, instead of basing the visibility score on number of OCR'ed characters that match the stored placemark name, the sever 110 may determine what percentage of the signage logo matches the stored placemark logo.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method of generating turn-by-turn directions, the method comprising:
    receiving, by a server, a request for turn-by-turn directions, the request including a first location and a second location;
    identifying a route between the first location and the second location;
    identifying a plurality of placemarks that are located along the route, the plurality of placemarks each including a visible characteristic that is associated with the placemark;
    accessing an image corresponding to a location along the route;
    identifying the visible characteristic within the image that corresponds to at least one of the plurality of placemarks, the visible characteristic having an area associated therewith;
    accessing depth information to determine a distance of the visible characteristic from the image's location;
    multiplying the area of the visible characteristic within the image by a depth factor to determine a physical size of the visible characteristic;
    determining an identifiability score for the visible characteristic of the placemarks based, at least in part, on the determined physical size of the visible characteristic;
    selecting at least one of the plurality of placemarks based on the visible characteristic's identifiability score; and
    generating, by the server, a set of turn-by-turn directions that includes the selected placemark.

2. The method of claim 1, wherein the visible characteristic's identifiability score is calculated from at least one of: the visible characteristic's visibility from the route, the visible characteristic's prominence from the route, and the placemark's notoriety.

3. The method of claim 2, wherein the visible characteristic's visibility is determined by:
    identifying one or more text strings within the image; and
    determining an extent to which the text string matches a name of a given one of the plurality of placemarks located along the route.

4. The method of claim 2, wherein the visible characteristic's prominence from the route is determined by:
    accessing an image corresponding to a location along the route;
    identifying a text string within the image that corresponds to one of the plurality of placemarks; and
    determining a viewing angle covered by the text string.

5. The method of claim 4, wherein the accessing, identifying, and determining steps are performed on a plurality of images and wherein the visible characteristic's prominence is determined by calculating an average viewing angle covered by the text strings in the plurality of images.

6. The method of claim 4, wherein the viewing angle covered by the text string is determined by comparing the width of the text string with the width of the image.

7. The method of claim 4, wherein the viewing angle covered by the text string is determined by comparing the area of the text string with the area of the image.

8. The method of claim 2, wherein the placemark's notoriety is determined by evaluating whether the placemark corresponds to an entity having a plurality of locations throughout a predefined region.

9. The method of claim 8, wherein the placemark's notoriety is determined by evaluating whether the placemark is designated as being well known within a predefined region.

10. The method of claim 1, wherein the generated turn-by-turn direction includes a command to take an action relative to the position of the selected placemark.

11. The method of claim 1, further comprising transmitting the set of turn-by-turn directions to a client device.

12. The method of claim 1, further comprising:
    identifying content associated with the selected placemark; and
    transmitting the content with the set of turn-by-turn directions to a client device.

13. The method of claim 12, wherein the content is information associated with a business.

14. The method of claim 12, wherein the content is at least one: a coupon, an advertisement, or a website.

15. A device for generating turn-by-turn directions, the device comprising:
    a memory including a first part for storing instructions and a second part for storing turn-by-turn directions; and
    a processor coupled to the member, the processor configured to execute the instructions to:
    receive a request for turn-by-turn directions, the request including a first location and a second location;
    identify a route between the first location and the second location;
    identify a plurality of placemarks that are located along the route, the plurality of placemarks including signage that is associated with the placemark;
    access an image corresponding to a location along the route;
    identify signage text within the image that corresponds to one of the plurality of placemarks;
    compare the width of the signage text with the width of the image;
    determine an identifiability score for the signage along the route based, at least in part, on the comparison between the width of the signage text and width of the image;

selecting at least one of the plurality of placemarks based on the signage's identifiability score; and generate a set of turn-by-turn directions that includes the selected placemark.

16. The device of claim 15, wherein the signage's identifiability score is determined by: the signage's visibility from the route, the signage's prominence from the route, and the placemark's notoriety.

17. The device of claim 16, wherein the signage's visibility is determined by:

identifying one or more text strings within the image; and determining the extent to which the text string matches the name of a given one of the plurality of placemarks located along the route.

18. The device of claim 16, wherein the signage's prominence from the route is determined by:

identifying a text string within the image that corresponds to one of the plurality of placemarks; and determining a viewing angle covered by the text string.

19. The device of claim 16, wherein the signage's prominence from the route is determined by:

identifying a text string within the image that corresponds to one of the plurality of placemarks;

accessing depth information to determine a distance of the text string from the image's location; and multiplying the area of the text string within the image by a depth factor in order to determine a physical size of the text string.

20. A method of generating turn-by-turn directions, the method comprising:

receiving, by a server, a request for turn-by-turn directions, the request including a first location and a second location;

identifying a route between the first location and the second location;

identifying a plurality of placemarks that are located along the route, the plurality of placemarks each including a visible characteristic that is associated with the placemark;

accessing a plurality of images corresponding to locations along a portion of the route;

calculating, based on the plurality of images, an average identifiability score of the visible characteristic for one or more of the plurality of placemarks;

selecting at least one of the plurality of placemarks based on the visible characteristic's average identifiability score; and generating, by the server, a set of turn-by-turn directions that includes the selected placemark.

21. The method of claim 20, wherein the average identifiability score is calculated based on images that were taken within a predetermined distance from a particular location along the route.

* * * * *